(12) United States Patent
Brennesholtz

(10) Patent No.: US 6,631,992 B2
(45) Date of Patent: Oct. 14, 2003

(54) PROJECTOR COLOR CORRECTION TO TARGET WHITE POINTS

(75) Inventor: Matthew Scott Brennesholtz, Pleasantville, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/822,458

(22) Filed: Mar. 30, 2001

(65) Prior Publication Data

US 2002/0140904 A1 Oct. 3, 2002

(51) Int. Cl.[7] .................. G03B 21/00; G03B 21/14; G03B 21/26; G02F 1/1335; G02B 5/30
(52) U.S. Cl. ............... 353/20; 353/8; 353/31; 353/34; 353/37; 349/9; 359/497; 359/501; 359/502
(58) Field of Search ................. 353/8, 20, 31, 353/33, 34, 37; 349/8, 9; 359/497, 501, 502

(56) References Cited

U.S. PATENT DOCUMENTS

| | | | |
|---|---|---|---|
| 5,200,844 A | * 4/1993 | Suvada | 349/11 |
| 5,387,920 A | 2/1995 | Bos et al. | 345/88 |
| 5,875,008 A | 2/1999 | Takahara et al. | 349/5 |
| 5,929,946 A | 7/1999 | Sharp et al. | 349/18 |
| 5,999,240 A | * 12/1999 | Sharp et al. | 349/119 |
| 6,183,091 B1 | * 2/2001 | Johnson et al. | 353/20 |
| 6,262,841 B1 | * 7/2001 | Dike | 359/483 |
| 6,337,759 B1 | * 1/2002 | Yamamoto | 359/267 |

FOREIGN PATENT DOCUMENTS

| | | | | |
|---|---|---|---|---|
| EP | 0390511 A2 | 10/1990 | | G03B/21/00 |
| EP | 0909974 A2 | 4/1999 | | G02F/1/1335 |
| JP | 7294869 | 11/1995 | | G02F/1/13 |

* cited by examiner

Primary Examiner—Russell Adams
Assistant Examiner—Magda Cruz

(57) ABSTRACT

A system for adjusting the color of a light source comprises a first polarizer to polarize the light source, a fixed retarder with its optical axis at a first angle to the polarized light, an electronically variable retarder with its optical axis at a second angle to the polarized light and a second polarizer to polarize the resultant light. This light source may be used where light of adjustable color is needed, for example in a theatrical spotlight or a liquid crystal projection system.

7 Claims, 2 Drawing Sheets

PROJECTOR COLOR CORRECTION TO TARGET WHITE POINTS

INDUSTRIAL FIELD OF APPLICATION

The invention is generally concerned with adjusting the color of a light to a desired, or "target," white. This is useful, for example, in spotlights for theatrical or film work. The invention is also concerned with adjusting the white of a liquid crystal display ("LCD") to a target white. The invention is adaptable to any LCD system, whether projection or direct view.

BACKGROUND OF THE INVENTION

Many different colors are specified as "white" in video and monitor systems. For example, 5400° K is specified as white for cinema work, but 6500° K is specified as white for video work. White colors form 3400° K to 9300° K are used for other applications. For an end user to accurately judge color of the finished product on a monitor, it is necessary to adjust the monitor white point to the white point specified for the particular application.

In CRT monitors, this can be accomplished by adjusting the relative gains of the red, green and blue video amplifiers so that when all three video signals (R, G an B) are equal, the desired target white is displayed. Changing the white point involves changing the relative gain of the red, green and blue amplifiers.

This type of system has several disadvantages when it is used on a LCD display. If the gain is done in the analog domain, it affects not only the white point, but, because of the non-linear nature of LCDs, all other colors as well. This then requires modified Gamma correction curves for each target white point. If the gain adjustment is done in the digital domain, it requires that some of the dynamic range be ignored and not used. Since 8 bits is only marginally enough bits for any serious color work, ignoring part of the dynamic range can lead to serious color artifacts. Even if the basic resolution is 10 or 12 bits, color artifacts can result from interpolating the video signal to a smaller dynamic range.

Therefore, it is desirable to be able to adjust the color of a LCD display (projection or direct view) without changing the input video signal in either the analog or digital domains. The adjustment should be optical and controllable while the projector is operating.

EP 909 974 covers the use of one or two retarders with a reflective LCD cell to make the system achromatic and improve the contrast. The retarder(s) are with the LCD between the polarization-sensitive beam splitter ("PBS") and the mirror. The system of the invention puts the retarders in the illumination path so they have no effect on contrast. The system is not designed to minimize chromatic effects. Rather, the system of the invention is designed to add exactly the right amount of chromatic effects to allow color correction to target whites.

U.S. Pat. No. 5,875,008 describes the use of three sets of compensators, one with each LCD to adjust color point, efficiency and contrast of the individual LCDs. While one effect of this is to change the white point, that is not the goal; and the approach is different from the approach of the invention. Again, the compensators are not in the illumination path.

EP 390,511 describes the use of three sets of one or two compensators, one with each LCD to adjust color point, efficiency and contrast of the individual LCDs. While one effect of this is to change the white point, that is not the goal and the approach is different from the approach of the invention. Again, the compensators are not in the illumination path.

Kokai 07-294,869 describes a system that adjusts the polarizers of at least two LCDs to adjust the efficiency of the cell. This then adjusts the color balance and the white point. The system of the invention adjusts retarders, not polarizers, and one common retarder is used for all three colors. Adjusting polarizers involves a mechanical system. Adjusting retarders can be done electronically.

Application PHN17544 EP-P describes a method for adjustment of a desired white color of at least a portion of an image, by a system provided with a light source and an electro-optical modulator, wherein light from the light source is modulated by the electro-optical modulator into the image, wherein the system comprises with the electro-optical modulator cooperating, a light adjustment device, wherein the electro-optical modulator is driven for at least a portion to a desired maximum, the portion being imaged on the portion of the image, after which the color of said portion of the image is adjusted to the desired white color by the light adjustment device.

A device includes a cooperating light adjustment device for each of the respective LCD panels. Therefore, a two LCD panel projector comprises two light adjustment panels, and a three LCD panel projector comprises three light adjustment panels. Also an embodiment is described in which a stack of light adjustment devices is used, but still the number of light adjustment devices corresponds to the number of electro-optical modulators.

SUMMARY OF THE INVENTION

It is an object of the present invention to provide a system and a method for adjusting the color of a light to a target white.

It is an object of the present invention to provide a system and a method for adjusting the target white of a LCD system.

It is another object of the present invention to provide such a system that is adapted to either a projection or direct view LCD system.

It is an object of the present invention to provide a simple and reliable electronic system for adjusting the target white of a LCD system.

These objects and others that will become apparent from the following specification are achieved by a system for adjusting the color of a light source which comprises the following components:

a) a first polarizer to polarize the light source,
b) a fixed retarder with its optical axis at a first angle to the polarized light,
c) an electronically variable retarder, with its optical axis at a second angle to the polarized light, and
d) a second polarizer to polarize the resultant light.

It is preferred that the system consists essentially of components a) to d). It is also preferred that the components be present in the order a) to d). Alternatively, the components may be in the order a), c), b) and d). Preferably, the polarized light is partially polarized. The first polarizer to polarize the light source may comprise a polarization conversion system. Preferably, the fixed retarder is a quarter wave retarder. The variable retarder can vary in the range of 700–1100 nm. Preferably, the light source is used to illuminate a display with one or more spatial light modulators. It is preferred that the spatial light modulator(s) be liquid crystal device(s).

The invention comprises a system for color correction. One version of the system uses the partially polarized light produced by an Integrator/Polarization Conversion System (PCS) combination and an ECB cell and one or more fixed compensator foils. By adjusting the voltages on the ECB cell(s), it is possible to adjust the relative amounts of red, green and blue light reaching the LCDs and therefore adjust the color temperature of the projector. Since all adjustments are done electronically, not mechanically, the system is simple and reliable.

The color correction scheme requires that the basic colorimetry of the display system be correct for one white point. This approach then allows the white point color to be adjusted over sufficient range to allow correction to other white points. The system has been tested with the optics from the color drum projector, U.S. patent application Ser. No. 09/127,003 but would be adaptable to any LCD system, whether projection or direct view.

PREFERRED EMBODIMENTS OF THE INVENTION

Figure 1:
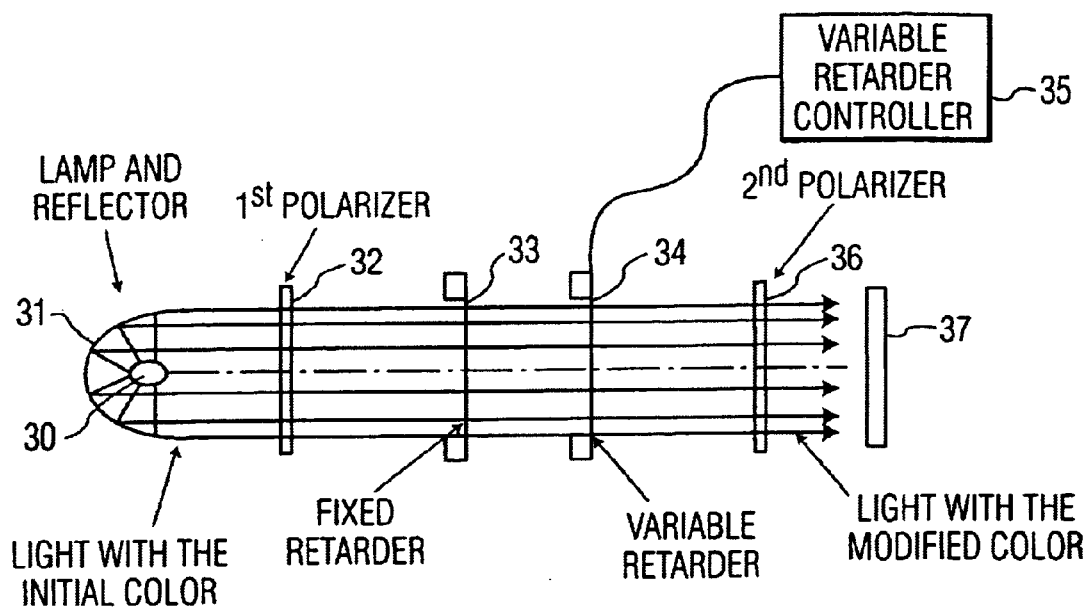
FIG. 1 is a simplified general diagram of the color correction system of the invention with a variable retarder.

FIG. 1 is a simplified general diagram of the color correction system of the invention with a variable retarder. The light with the initial color from lamp 30 is reflected by reflector 31 to the right, where it passes through a first polarizer 32, where it is partially polarized with horizontal polarization. The partially polarized light then passes through fixed retarder 33 and then through a variable retarder 34, and the retardance is reduced as voltage is applied by the variable retarder controller 35. After it passes through the second polarizer 36, it may be used as a spotlight or be passed to one or more spatial light modulators 37, which may be either reflective or transmissive, e.g. a liquid crystal device.

Figure 2:
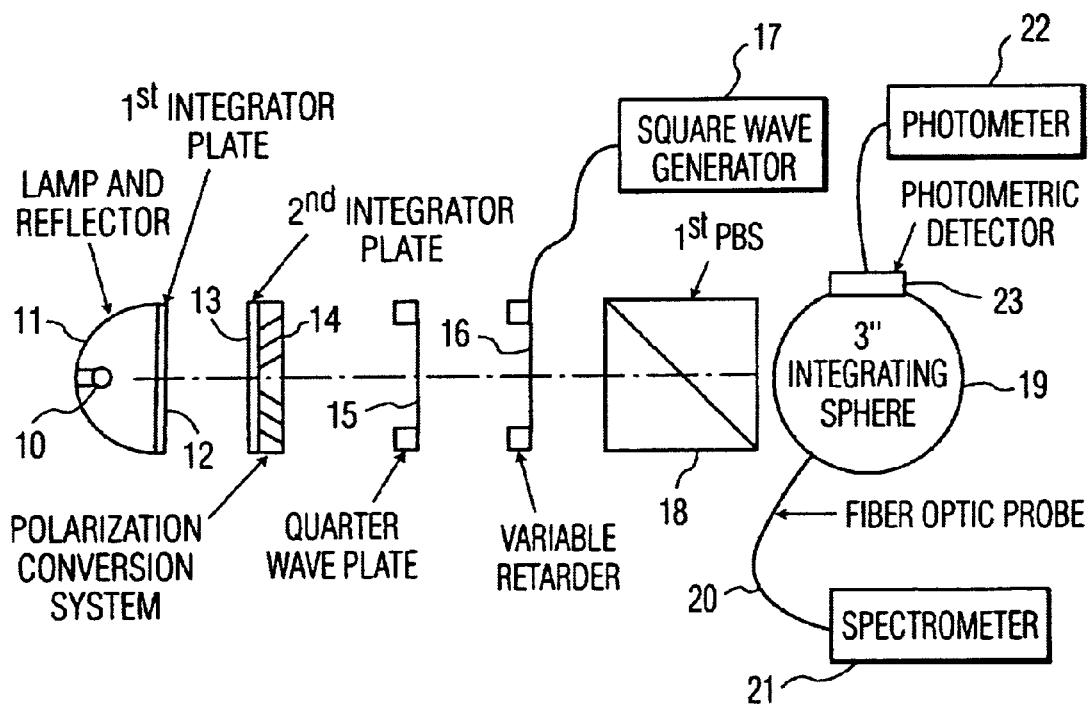
FIG. 2 is a diagram of a color correction system used to generate the measured data in FIGS. 3 and 4.

As shown in FIG. 2, the white point color adjustment involves a single ECB cell (or other electronically variable retarder) and a fixed retarder. Due to the physical size of the available variable retarder from Meadow Lark, it was impossible to put the system in the complete drum projector. Components from the drum projector were installed on an optical rail for testing, as shown in FIG. 2.

In the description of this system, all azimuthal angles about the optical axis are positive when they are clockwise as seen from the lamp 10. The light from lamp 10 is reflected by reflector 11 to the right, where it passes through a first integrator plate 12 and then to second integrator plate 13. The output of the polarization conversion system 14 unit is partially polarized with horizontal polarization.

The fast axis of the quarter wave plate 15 was set at −10°. The variable retarder 16 used in this test had a retardance of 1100 nm when no voltage was applied, and the retardance was reduced as voltage was applied. The output of square wave generator 17 was input to variable retarder 16 in the setup for which the results are given in FIGS. 3 and 4, and the axis of the variable retarder 16 was set at +45°. Other combinations of retardance value (i.e., other than quarter wave), angle of the retarder 15 and angle of the variable retarder 16 give similar results, with different drive voltages on the variable retarder 16. For these results, a square wave generator 17 output a 360 Hz square wave with rms values in the range of 3.2V to 4.3V. The use of 360 Hz was a limitation of the variable retarder drive system. More commonly, a higher frequency such as 1 kHz would be used. There is no need to have the variable retarder frequency tied to a multiple of the video field rate.

After it passes through polarization conversion system 14, the light is approximately 70% horizontal polarized. This is equivalent to 90° azimuthal angle for the e-field, and it is p-polarized at the polarization-sensitive beam splitter (PBS) 18. The remaining 30% of the light is vertically polarized, (0° or s- at the polarization-sensitive beam splitter (PBS) 18). In normal operation without the present invention, this s-polarized light reflects at the polarization-sensitive beam splitter (PBS) 18 and is lost to the system. The light from the PBS 18 enters a 3" integrating sphere 19, where its wavelength and color are sampled by fiber optic probe 20 and measured by spectrometer 21, sampling the light from 3" integrating sphere 19. The intensity of the light is measured by photometer 22, which works in conjunction with a photometric detector 23.

Figure 3:
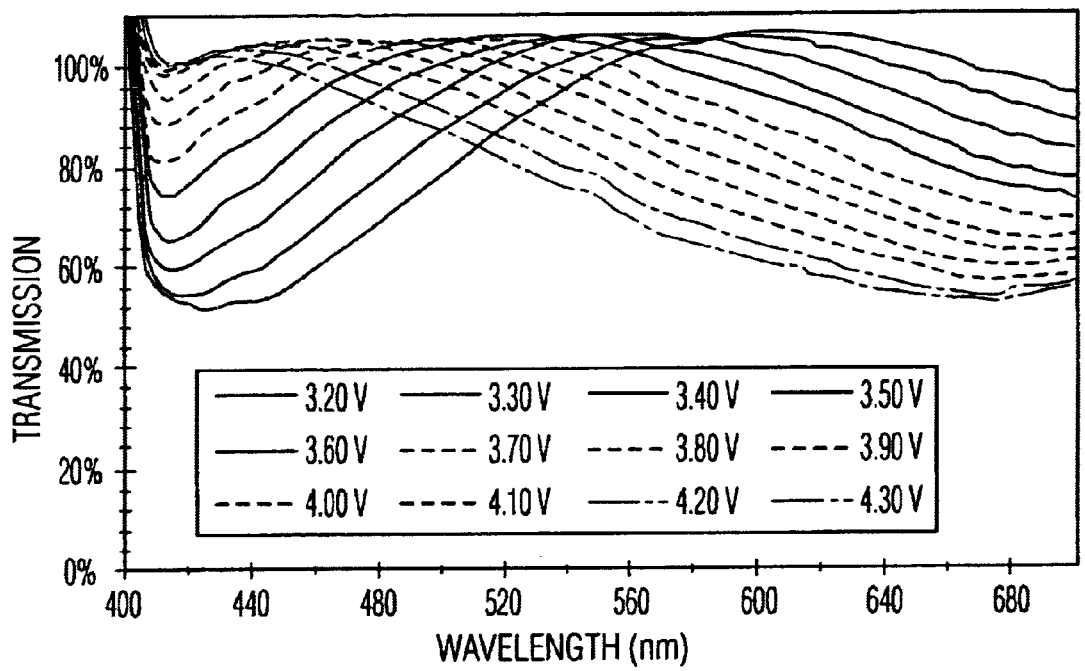
FIG. 3 is a graph of the transmission of the quarter wave and variable retarders between the polarization-sensitive beam splitter and the polarization conversion system.

FIG. 3 shows the transmission of the polarization conversion system/quarter wave retarder/variable retarder/polarization-sensitive beam splitter system as a function of voltage and wavelength. This measured data was normalized to a 100% level equal to the light transmitted by the polarization conversion system/polarization-sensitive beam splitter system with no fixed or variable retarder in the path. The data were corrected for the transmission in unpolarized light of the quarter wave plate and the variable retarder. This transmission was 82.2% (photometric with the UHP lamp) in the test setup. With proper optical coupling and anti-reflective coating, this could be expected to be >98% in a production system. Note that the peak transmission it actually >100%. (106.9%) It is not known if this value is an artifact of the measurement or if it is real. Due to the presence of the s-polarized light that normally would be discarded, a transmission of >100% is not physically impossible, although it is probably not likely either.

Note that at every voltage, there is a wavelength where the peak transmission is equal to the maximum possible. This is a very desirable feature in a color correction system because it means one is not discarding light unnecessarily. As the voltage varies, the maximum transmission varies from the red region at low voltages, through the green region at medium voltages to the blue region at higher voltages.

When these transmissions are convolved with the drum projector spectral throughput efficiencies, a range of colors is produced. This range of colors is shown in FIG. 3. This graph was produced assuming the basic white color was corrected to a color slightly more greenish than 6550° K prior to the white adjustment. Because there is only one degree of freedom, it is only possible to adjust the color along one line. This line corresponds approximately with the black body line. Since all target white points are on or near the black body link, this is not a major problem.

Figure 4:
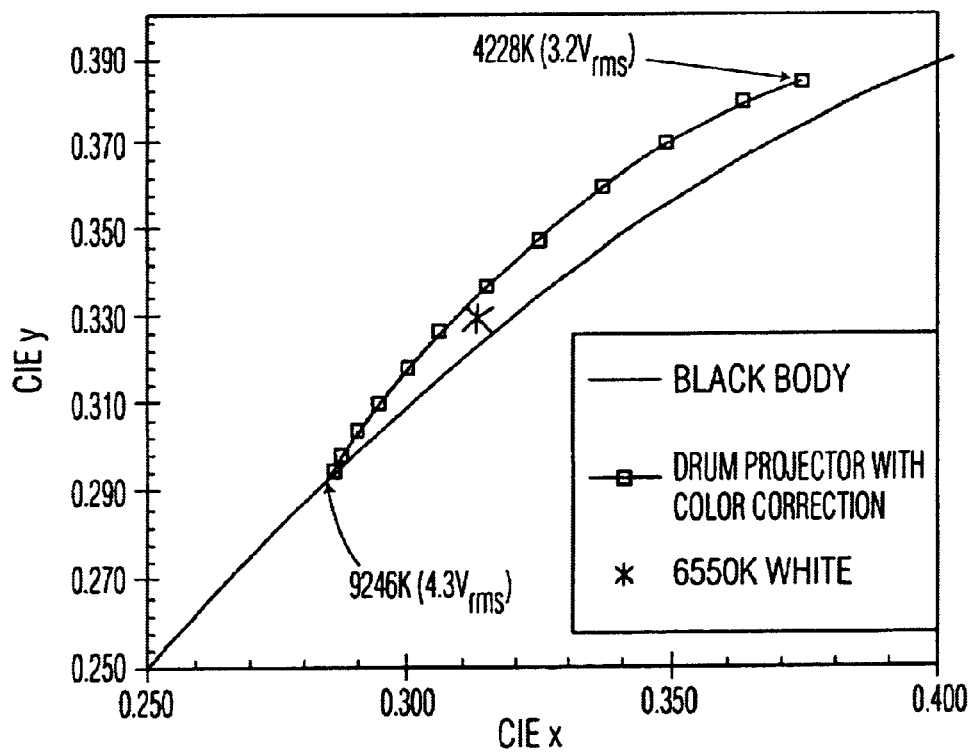
FIG. 4 is a graph showing the adjustment gamut of the color drum projector with the quarter wave and variable retarders.

While the adjustment gamut line in FIG. 4 does not exactly match the black body line, it is close enough to the black body line and parallel enough to it to produce the desired range of white colors.

The fixed/variable retarder system described above requires partially polarized light for correct operation. If fully polarized light is used, the slope of the color adjustment gamut line becomes too steep compared to the slope of the black body curve. In a system with a polarization conversion system, this is not a problem because the light after the polarization conversion system is partially polarized in all present systems. In a system where the light is fully polarized, it would be necessary to design the fixed/variable retarder system with different retardance values and/or angles between the retarders and the polarized light in order to produce the desired type of correction.

In a system where the light is unpolarized (i.e., a system without a polarization conversion system), it is necessary to partially polarize the light for the fixed/variable retarder color correction system to work correctly. One way to accomplish this, for example, is to use one or more Brewster plates in the illumination path prior to the color correction system. These could be inserted, for example, between the two integrator plates in a LCD projection system in order to avoid lengthening the optical path.

By adjusting the retardance and angle of the fixed retarder and the angle of the variable retarder, it is possible to change their slope of the adjustment gamut shown in FIG. 4 so it becomes more parallel to the black body curve, if desired. This would be done during the design phase and would not be user adjustable. The user would only be able to adjust the retardance of the variable retarder by adjusting the voltage across the retarder.

The foregoing specification and drawings have thus described and illustrated a system and a method for adjusting the target white of a lighting system, particularly the target white of an LCD system, which fulfill all the objects and advantages sought therefor. Many changes, modifications, variations and other uses and applications of the subject invention will, however, become apparent to those skilled in the art after considering this specification which discloses the preferred embodiments thereof. All such changes, modifications, variations and other uses and applications which do not depart from the spirit and scope of the invention are deemed to be covered by the invention, which is to be limited only to the claims which follow.

I claim:

1. A system for adjusting a color of a light source along an illumination path, comprising:

first integrator plate positioned along the illumination path;

a first polarizer positioned along the illumination path downstream from said first integrator plate, said first polarizer to polarize the light source a fixed retarder positioned along the illumination path downstream from said first integrator plate, said fixed retarder having a first optical axis at a first angle to the illumination path an electronically variable retarder positioned along the illumination path downstream from said first integrator plate, said electronically variable retarder having a second optical axis at a second angle to the illumination path; and a second polarizer positioned along the illumination path downstream from said first integrator plate, said second polarizer to polarize the polarized light; and a second integrator plate positioned along the illumination path downstream from said first integrator plate.

2. The system of claim 1, wherein the polarized light is partially polarized.

3. The system of claim 1, wherein said first polarizer includes a polarization conversion system.

4. The system of claim 1, wherein said fixed retarder is a quarter wave retarder.

5. The system of claim 1, wherein said variable retarder varies in a range of 700–110 nm.

6. The system of claim 1, further comprising:

a spatial light modulator, wherein the light source is used to illuminate said spatial light modulator.

7. The system of claim 6, wherein said spatial light modulator is a liquid crystal device.

\* \* \* \* \*